Figure 1:
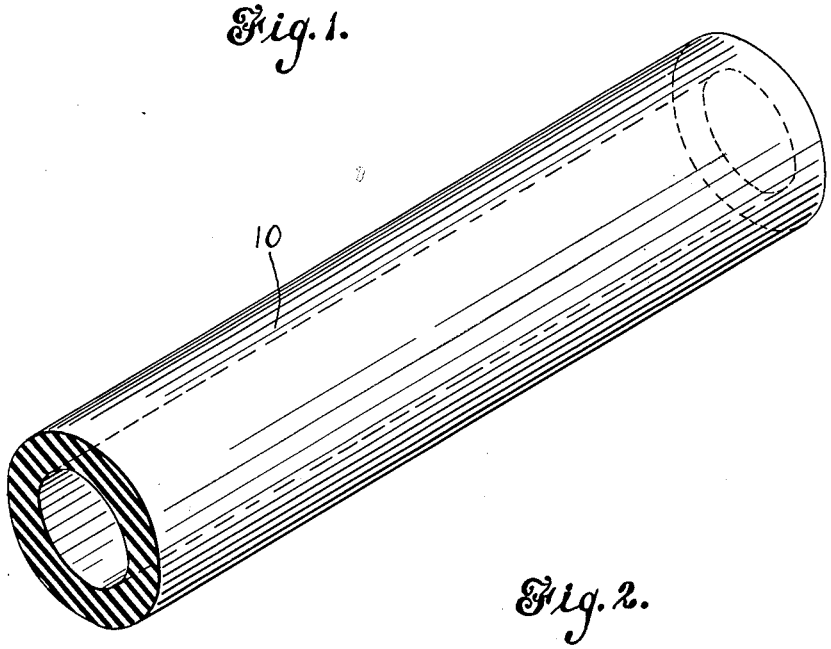

Feb. 28, 1956

A. S. KIDWELL 2,736,720

FUEL-RESISTANT ARTICLES HAVING LOW TEMPERATURE FLEXIBILITY
FROM HALOGENATED POLYDIMETHYLSILOXANES

Filed April 13, 1953

INVENTOR

Alfred S. Kidwell

BY

ATTORNEYS

United States Patent Office 2,736,720
Patented Feb. 28, 1956

---

2,736,720

FUEL-RESISTANT ARTICLES HAVING LOW TEMPERATURE FLEXIBILITY FROM HALOGENATED POLYDIMETHYLSILOXANES

Alfred S. Kidwell, Milford, Conn., assignor to The Connecticut Hard Rubber Company, New Haven, Conn., a corporation of Connecticut Application April 13, 1953, Serial No. 348,234

3 Claims. (Cl. 260—37)

This invention relates to members suitable for contacting hydrocarbons and having a flexibility which is retained even at very low temperatures. A process for preparing compositions employed in the fuel-resistant compositions is also a part of the invention.

Heretofore fuel-pump diaphragms, flexible fuel lines or the like have been designed for use at normal temperatures and have been unsuitable at low temperatures because the flexible elastomers having a sufficient resistance to aromatic fuels to be usable as flexible fuel lines have been brittle when cooled to temperatures of the type encountered under very cold aircraft conditions such as −80° F. Heretofore silicone rubber has been employed to provide flexible structural materials for very low temperatures, but silicone rubber of the type heretofore available has been very sensitive to aromatic fuels. Ordinary silicone rubber tends to swell to as much as 600% its normal volume when subjected to aromatic fuels.

It is an object of the present invention to provide structural materials having considerable elongation and flexibility under extremely cold conditions, and also capable of withstanding for prolonged periods of time the action of hydrocarbon mixtures such as aviation fuel. It is an object of the present invention to provide structural materials having a fuel resistance (i. e. a tendency to swell only a relatively small amount in aromatic solvents) comparable to that of flexible fuel lines heretofore available, but having a low-temperature flexilibity comparable to that of arctic grade silicone rubber.

An important feature of the present invention is the use of partially chlorinated polydimethylsiloxane structural materials as hydrocarbon-contacting members flexible at low temperatures such as encountered in high altitude aircraft or severe arctic weather.

Figure 2:
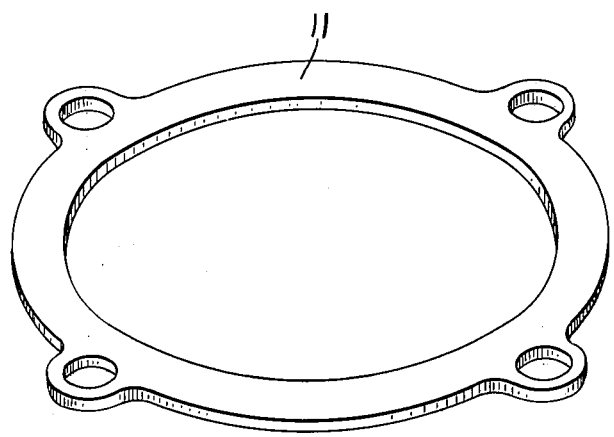

In the drawings:

Fig. 1 shows a flexible fuel hose made in accordance with the present invention; and Fig. 2 shows a gasket constructed in accordance with the present invention.

The materials generally known as silicone rubbers are ordinarily prepared by a process involving the curing of a mixture of a filler, a curing agent, and a polyorganosiloxane gum of very high viscosity. The silicone rubbers resulting from such procedures differ from other types of elastomers partly by reason of their ability to maintain their flexibility at very low temperatures.

The curves showing the force required to deform an elastomer sample at various temperatures show a generally uniform slope at room temperatures, but at very low temperatures, there is a conspicuous deflection in the curves. An accepted procedure for measuring the low temperature characteristics of an elastomer is designated as ASTM test D797. The temperature at which Young's modulus is 10,000 p. s. i. is frequently designated as a stiffening temperature. Some elastomers such as polychloroprene have a stiffening temperature of about −35° F. None of the fuel-resistant elastomers have had stiffening temperatures lower than about −60° F. Silicone rubbers have had stiffening temperatures as low as −130° F. However, such silicone rubbers have been unsuitable for use in contact with fuels such as aviation gasoline because of their tendency to swell excessively during prolonged contact with liquid aromatic fuel, lubricating oils, organic solvents, and other hydrocarbons, hydrocarbon derivatives and mixtures thereof.

Heretofore there have been proposals for preparing chlorinated derivatives of methyl silicone compounds. Procedures have been described for preparing methylchloromethyldichlorosilane. The difficulties of utilizing such a monomer have been great enough that polymethylchloromethylsiloxane gums derived from such a monomer have not been commercially available. Prior workers have emphasized that in the chlorination of methylsilicon compounds the chlorination of a molecule proceeded stepwise with a very strong tendency for the second or third chlorine atom entering a molecule to attach itself to the carbon atom first receiving a chlorine atom. Accordingly, prior workers emphasized that by the chlorination of dimethylsiloxanes such as the cyclic tetramer or cyclic pentamer, the products had relatively many trichloromethyl and dichloromethyl groups with relatively few monochloromethyl groups and with a relatively large number of unchlorinated methyl groups. Prior workers failed to disclose and tended to discourage chlorination of high-molecular-weight polydimethylsiloxanes because the hydrogen chloride by-product caused troublesome depolymerization. Because anhydrous hydrogen chloride in a dry organic solvent has been one of the most powerful depolymerization catalysts known, the occurrence of extensive depolymerization has been generally accepted.

Heretofore only low-molecular-weight chlorinated dimethylsiloxanes, such as $((Cl_{2.5}H_{0.5}C)_2SiO)_5$, have been disclosed, and such chlorinated silicones have been proposed as lubricants, coatings for glass fibers and for similar uses appropriate for relatively low-molecular-weight polymers.

The series of operations required to convert a dichloroorganosilane into a very viscous silicone gum suitable for the normal process of fabricating silicone rubber articles constitute some of the most troublesome portions of the manufacture of silicone rubber from its basic raw materials. According to the present invention the difficulties involved in the hydrolysis of a specialized product such as methylchloromethyldichlorosilane are obviated. A commercially available viscous silicone gum is employed in the present invention as a starting material for preparing a chlorinated silicone rubber product.

According to the present invention the commercially available silicone gum is dissolved in a halogenated solvent and subjected to chlorine at a very rapid rate, at an elevated temperature, and with very rapid removal of hydrogen chloride, to form a partially chlorinated product.

As a result of this novel process there is produced a novel product, a partially chlorinated elastomeric silicone having a molecular weight greater than that of conventional silicone elastomer gums. Although some depolymerization occurs, the average molecular weight can be increased more by the chlorination than it is decreased by the depolymerization, although such a result is contrary to the prior art teaching that extensive depolymerization can occur in such a chlorination.

The partially chlorinated silicone rubber materials of the present invention were found to possess sufficient flexibility at −80° F. to be useful for flexible fuel lines, pump diaphragms, and the like. Comparative tests demonstrated that these materials possessed advantageous resistance to swelling upon prolonged contact with aromatic hydrocarbons. Tests were made particularly to determine the percentage volume of swelling resulting from such contact with fuels such as a mixture of 70% iso-octane and 30% toluene.

CONTROL TEST

A control test was conducted to determine the magnitude of swelling of a conventional silicone rubber material. A silicone elastomeric gum available commercially from the General Electric Company as SE-76, and reported to be a fairly pure linear polydimethylsiloxane and reported to have a molecular weight of about 430,000, had a very high viscosity. One hundred parts of the gum were mixed with 15 parts by volume of an aluminum oxide filler available commercially as "Alon," and with 5 parts by weight of benzoyl peroxide, and press-cured at 230° F. for 15 minutes and then cured in an oven for one hour at 308° F. The silicone rubber had a tensile strength of 728 lbs. per square inch, an elongation of 500%, a Shore A hardness of 46, and a very poor resistance to aromatic fuels. This silicone rubber swelled more than three times its original volume when subjected to the test fuel for a period of one hour. The swelling amounted to 541% when the material was immersed in the fuel for 24 hours. The fuel resistance was slightly improved by subjecting the conventional silicone rubber to a temperature of 300° F. for 16 hours, after which the material increased in volume 263% during the first hour and 370% after 24 hours immersion in the test fuel. The prolongated heat treatment also reduced the elongation to 325% and increased the Shore A hardness to 62.

Example 1

A solution of 7½% by weight of the elastomeric silicone gum, type SE-76 in carbon tetrachloride, was modified by the addition of benzoyl peroxide amounting to 0.2% of the weight of the elastomer. Other activating agents providing free radicals for a chlorination reaction would be equivalent to benzoyl peroxide. As rapid and smooth reaction rates are achieved by this advantageous activated chlorination as by the use of light. The solution was heated to 140° F. and subjected to a stream of chlorine under conditions promoting very rapid removal of the hydrogen chloride resulting from the chlorination reaction. For example, about two or three volumes of nitrogen per volume of chlorine were sometimes used to flush out the hydrogen chloride as rapidly as it was formed. The viscosity of the reaction mixture was kept small to minimize entrainment of hydrogen chloride. The solvent was subsequently distilled off from the mixture, and there was recovered a partially chlorinated silicone gum containing approximately 0.7 atom of chlorine per carbon atom or 1.4 atoms of chlorine per silicon atom. Approximately 100 parts of this partially chlorinated silicone gum was mixed with 15 volumes of alumina filler and 5 parts by weight of benzoyl peroxide, molded into a testing sample, press-cured for 15 minutes at 230° F., oven-cured for one hour at 308° F. and then baked at 300° F. for an additional 16 hours. When subjected to immersion in the standard fuel, it increased in volume only 40% during the first hour and only 77% after a 24-hour immersion. Moreover, the article was flexible and had the desirable properties of an elastomer.

Example 2

Type SE-76 silicone elastomer gum was dissolved in carbontetrachloride and subjected to a gas stream consisting of two parts of nitrogen and one part of chlorine in the absence of light for approximately 3 hours. A smaller concentration of activating agent, that is, 0.1% instead of 0.2% of benzoyl peroxide was utilized, and a lower temperature, that is 122° F. instead of 140° F., was employed. After solvent removal, the product, which was found to contain 0.56 chlorine atom per carbon atom, was used in molding a testing sample. After press-curing for 15 minutes at 230° F., oven-curing the article for one hour at 308° F. and an additional 16 hours at 300° F., the filled rubber article had a resistance to fuels such that it increased in volume only 53% during the first hour and only 85% after 24 hours immersion.

Example 3

Type SE-76 silicone elastomer gum was dissolved in carbontetrachloride maintained at 1220° F. and subjected to a stream of about three parts of nitrogen and one part of chlorine and to light to form a partially chlorinated silicone gum, which was employed in molding a fuel tank liner. This liner increased in volume only 40% during the first hour and 83% upon 24 hours immersion in a standard fuel.

Example 4

A dilute solution of type SE-76 gum in a solution of carbontetrachloride was subjected to chlorine in the presence of ultra-violet light at 131° F. After solvent removal and drying, the product contained 0.87 atom of chlorine per carbon atom. The cured rubber prepared from the product of this reaction, after an initial cure of only one hour, and without the advantage of prolonged curing, increased in volume only 54% during a one-hour immersion test.

TABLE 1

Some of the results of Examples 1 to 4 are summarized in the following table:

| Example | Tensile strength, p. s. i. | Elongation, percent | Hardness, Shore A | Volume percent swelling | |
|---|---|---|---|---|---|
| | | | | 1 hr. | 24 hrs. |
| (control) | 728 | 500 | 46 | 301 | 541 |
| (baked 16 hrs.) | 960 | 325 | 52 | 263 | 370 |
| 1 | 730 | 150 | 56 | 64 | 102 |
| 1 (baked 16 hrs.) | 292 | 50 | 80 | 40 | 77 |
| 2 | 246 | 75 | 55 | 66 | 103 |
| 2 (baked 16 hrs.) | 189 | 25 | 74 | 53 | 85 |
| 3 | 627 | 175 | 65 | 67 | 106 |
| 3 (baked 16 hrs.) | 800 | 25 | 94 | 40 | 83 |
| 4 | 666 | 150 | 60 | 54 | 112 |
| 4 (baked 16 hrs.) | 214 | 25 | 76 | 22 | (¹) |

¹ Not tested.

Example 5

A polydimethylsiloxane elastomer gum was dissolved in carbontetrachloride and subject to a stream of two parts of nitrogen and one part of chlorine for 75 hours. The partially chlorinated silicone gum was mixed with 20 volumes of alumina and 5% benzoyl peroxide. The mixture formed into a sheet and cured in a mold for 15 minutes at 230° F. and in an oven for one hour at 300° F. The product increased in volume only 80% when immersed in the standard fuel for 24 hours. The tensile strength of this cured sheet was 500 p. s. i., and it had an elongation of 100%.

Example 6

A partially chlorinated silicone gum was prepared in accordance with the procedure of Example 4, and mixed with a smaller amount of unchlorinated silicone gum. The silicone rubber resulting from this mixture had a high resistance to swelling in contact with fuels, and also had a significantly higher tensile strength and elongation than the products which did not contain any of the unmodified polydimethylsiloxane gum. Numerous tests were conducted to determine what proportions of partially chlorinated and straight polydimethylsiloxane could be employed in the rubbers. It was found that even a small amount of the straight gum helped to increase the tensile strength of the rubber, and that particularly advantageous results were obtained when the gum was less than 49% by weight of the gum mixture. It was found that the use of excessively large amounts of the unmodified gum in the mixtures greatly impaired the swelling resistance of the compositions. Thus it was determined that the fuel-resistant materials must be principally or entirely chlorinated silicone rubber with a lesser amount, if any, of the raw gum.

Example 7

A polydimethylsiloxane elastomer gum might be dissolved in 20 parts of a chlorinated solvent such as tetrachloroethylene, and the solution heated to 180° F. Dilauryl peroxide could be employed as activating agent in an amount consisting of 1% of the siloxane. A mixture comprising about 4 parts of chlorine and 6 parts of nitrogen would be passed through the solution at a rate adapted to maintain the temperature at 170°±10° for a time sufficient to provide slightly more than a molecular equivalent of chlorine per dimethylsiloxy monomer unit in the polymer. After stripping the tetrachloroethylene under vacuum, the partially chlorinated silicone would be a viscous gum, convertible into a silicone rubber by compounding with 15 volumes titanium dioxide and 2 parts benzoyl peroxide. Gaskets, O-ring seals, fuel pump diaphragms, flexible tubing, and other fuel-contacting members made from such rubber would resist swelling in aromatic aviation gasoline as well as conventional fuel-contacting members, but would have the important advantage of such a low stiffening temperature as to be bent around a ¼" mandrel (⅛" radius) at —70° F.

Example 8

To show the various modifications possible, a series of polydimethylsiloxanes of high-molecular-weight were chlorinated to a chlorine content equivalent to more than one but less than two chlorine atoms per silicon atom, and the results were consistent with those obtained with type SE–76 gum. Various solvents were tested to show that methylene chloride was so volatile as to not provide a satisfactory solvent, and to show that completely halogenated volatile solvents, such as tetrachloroethylene and carbon tetrachloride were satisfactory. Partially or completely fluorinated solvents of a type not readily chlorinated under the reaction conditions, such as hexachlorodifluoropropane and benzyltrifluoride could be used. Trichloroethylene was shown to be satisfactory.

Various free radical generators such as benzoyl peroxide, lauryl peroxide and ditertiarylbutyl peroxide, activate the chlorination reaction satisfactorily. Some of the fillers which can be employed in the partially chlorinated silicone rubber include Aerosil, Santocel, and Hi Sil (all forms of silicon dioxide), zinc oxide, magnesium oxide, titanium dioxide, and aluminum oxide.

In the drawings, there is shown a flexible tube 10 prepared from a silicone rubber composition having the highly advantageous fuel resistance previously described. The compositions are useful for fabricating any article likely to be in prolonged contact with hydrocarbon fuels, particularly aromatic aviation gasoline. For example, the compositions can be used for the production of a gasket 11 adapted to be employed in a fuel pump.

The process of preparing the fuel-resistant compositions and articles involves the control of reaction conditions for removing the hydrogen chloride from the reaction zones with maximum rapidity. High-molecular-weight, high viscous polydimethylsiloxane is dissolved in a halogenated solvent such as carbon tetrachloride, tetrachloroethylene, bistrichloromethylmethylene fluoride, or the like. Relatively dilute solutions, such as 7–10% gum in carbon tetrachloride are employed in order that a low viscosity characterizes the solution being chlorinated. This solution is heated to a suitable reaction temperature such as from 100° F. to 180° F. The elevated temperature further reduces the solution viscosity, thus minimizing entrainment of hydrogen chloride. The elevated temperature also accelerates the chlorination reaction. After the vigorous exothermic reaction is operating, cooling means, such as a cooling jacket and/or reflux condenser, are employed to maintain the desired temperature.

It is desirable to conduct the chlorination rapidly, inasmuch as the substitution reaction proceeds almost instantaneously, whereas the depolymerization reaction is so much slower as to be dependent upon the duration of contact between hydrogen chloride and the silicone. The process employs a diluent gas adapted to flush out the hydrogen chloride at a rapid rate. A gas inert to the products and reactants under the reaction conditions, such as decefluoropentane, carbon dioxide, carbon tetrafluoride, but preferably nitrogen is employed as a flushing gas, and the mixture of chlorine and a significant amount such as several parts of an inert gas such as nitrogen per part of chlorine is then passed through the solution.

Another feature of the process is the feeding of chlorine to the solution at a rate more rapid than the chlorine can react. Instead of following a common practice of avoiding excess chlorine, an excess is carefully and intentionally employed. The effluent gases can be analyzed to determine the amount of excess chlorine. Because the partial chlorination of dimethylsiloxane elastomer gum proceeds so readily in the presence of the free radical catalysts employed, the chlorine can be passed into the solution at a rapid rate while complying with the requirement that the unreacted or excess chlorine in the exit gases should be from 5 to 40% of the chlorine input. The chlorination is conducted for a sufficient time to subject the silicone to a quantity of chlorine corresponding to from 110 to 210% of a chlorine to carbon atom reactant equivalency. By the use of all of these controls upon the chlorination reaction, that is, by maintaining low viscosity, elevated temperature, flushing gas current, excess chlorine, and for a sufficient time to subject the silicone to chlorine atoms corresponding to 110-210% of the carbon atoms, the process can be operated without extensive depolymerization of the elastomer.

Because flexible hoses, gaskets, and related fuel-contacting articles are the desired products, the composition is best described in terms of the properties of said articles. Numerous tests indicated that chlorinated polydimethylsiloxane elastomer gum or wax containing from 0.5 to 1.00 chlorine atoms per carbon atom were especially advantageous for these articles. Sometimes the chlorine content is expressed as the ratio of the chlorine to the silicon atom, in which case the range would be from greater than 1.00 but less than 2.00. Substantially the same range of chlorine content is expressed by designating the product as polydimethylsiloxane elastomer containing from 33 to 49% chlorine.

The fuel contacting members of the present invention are elastomers containing inorganic fillers, and other modifiers typical of cured silicone rubbers, but are characterized primarily by the polydimethylsiloxane elastomer having a chlorine content corresponding to a chlorine-silicon ratio greater than one but less than two.

What I claim is:

1. The method of preparing an elastic member resistant to swelling in aromatic fuels which includes the steps of dissolving a polydimethylsiloxane elastomeric gum having a molecular weight of at least 400,000 in from ten to twenty parts of a volatile halogenated solvent to form a low viscosity solution, maintaining the solution at a temperature between 100° F. and 180° F., adding small amounts of an organic peroxide to the solution, passing a mixture of chlorine and several times as much inert gas into said solution at such a rate that some chlorine leaves the solution unreacted, and for such a period of time that the moles of chlorine passed into the solution constitute 110–210% of the siloxy monomer units of the siloxane, removing the hydrogen chloride as rapidly as formed, recovering the partially chlorinated polydimethylsiloxane gum having a chlorine to silicon ratio greater than one but less than two, mixing the partially chlorinated silicone gum with a filler selected from the class consisting of silicon dioxide, titanium dioxide, magnesium oxide, aluminum oxide and zinc oxide, and additional organic peroxide curing agent, molding and then baking the mixture to form said elastic member from partially chlorinated silicone rubber.

2. The method of preparing an elastic member resistant to swelling in aromatic fuels which includes the steps of dissolving a polydimethylsiloxane elastomeric gum having a molecular weight of at least 400,000 in from ten to twenty parts of a volatile halogenated solvent to form a low viscosity solution, maintaining the solution at a temperature between 100° F. and 180° F., adding small amounts of an organic peroxide to the solution, passing a mixture of chlorine and several times as much inert gas into said solution at such a rate that some chlorine leaves the solution unreacted, and for such a period of time that the moles of chlorine passed into the solution constitute 100–210% of the siloxy monomer units of the siloxane, removing the hydrogen chloride as rapidly as formed, recovering the partially chlorinated polydimethylsiloxane gum having a chlorine to silicon ratio greater than one but less than two, mixing the partially chlorinated silicone gum with from ten to thirty volumes of a filler selected from the class consisting of silicon dioxide, titanium dioxide, magnesium oxide, aluminum oxide and zinc oxide, and benzoyl peroxide, molding and then baking the mixture to form said elastic member from partially chlorinated silicone rubber.

3. The method of preparing an elastic member resistant to swelling in aromatic fuels which includes the steps of dissolving a polydimethylsiloxane elastomeric gum having a molecular weight of at least 400,000 in from ten to twenty parts of a volatile halogenated solvent to form a low viscosity solution, maintaining the solution at a temperature between 100° F. and 180° F., adding small amounts of an organic peroxide to the solution selected from the class consisting of benzoyl peroxide, lauryl peroxide and ditertiarybutyl peroxide, passing a mixture of chlorine and several times as much inert gas into said solution at such a rate that some chlorine leaves the solution unreacted, and for such a period of time that the moles of chlorine passed into the solution constitutes 110–210% of the siloxy monomer units of the siloxane, removing the hydrogen chloride as rapidly as formed, recovering the partially chlorinated polydimethylsiloxane gum having a chlorine to silicon ratio greater than one but less than two, mixing the partially chlorinated silicone gum with from ten to thirty volumes of a filler selected from the class consisting of silicon dioxide, titanium dioxide, magnesium oxide, aluminum oxide and zinc oxide, and additional organic peroxide curing agents, molding and then baking the mixture to form said elastic member from partially chlorinated silicone rubber.

References Cited in the file of this patent

UNITED STATES PATENTS

| | | |
|---|---|---|
| 2,435,148 | McGregor | Jan. 27, 1948 |
| 2,474,578 | Gilliam | June 28, 1949 |
| 2,513,924 | Elliot | July 4, 1950 |
| 2,522,053 | McGregor | Sept. 12, 1950 |

FOREIGN PATENTS

| | | |
|---|---|---|
| 611,494 | Great Britain | Oct. 29, 1948 |